April 16, 1935. N. F. WINGET Re. 19,543

GUARD FOR SHOE HEELS

Original Filed April 24, 1933

Inventor:
Nell F. Winget.
By Whiteley and Buckman
Attorneys.

Reissued Apr. 16, 1935

Re. 19,543

UNITED STATES PATENT OFFICE 19,543

GUARD FOR SHOE HEELS

Nell F. Winget, Minneapolis, Minn.

Original No. 1,955,159, dated April 17, 1934, Serial No. 667,633, April 24, 1933. Application for reissue September 17, 1934, Serial No. 744,394

6 Claims. (Cl. 36—72)

Figure 1:
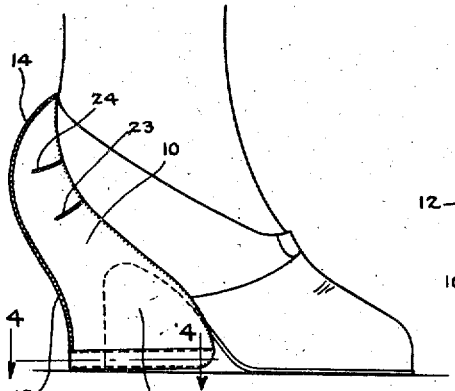

My invention relates to guards for shoes and has for its object to provide a simple and efficient construction adapted to slip over the heel portion of a shoe such as a woman's shoe and protect it from the wear which takes place in riding in an automobile, particularly when operating the automobile as driver.

It is a further object of my invention to provide such a construction which is cheap to manufacture, neat and attractive in appearance which can be slipped on over the heel easily and which will remain positioned after being put on.

The full objects and advantages of my invention will appear in connection with the detailed description thereof, and its novel features are particularly pointed out in the claims.

Figure 2:
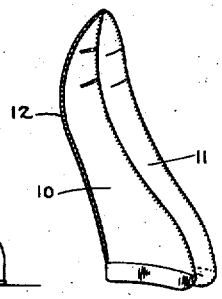
Figure 3:
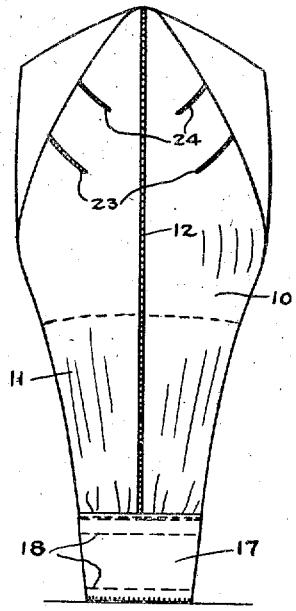
Figure 4:
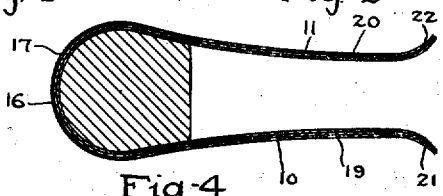

In the drawing, which illustrates a form of my invention,

Fig. 1 illustrates a woman's shoe in position on the foot of the wearer and having one of my heel guards applied thereto; Fig. 2 is a perspective view of the heel guard of Fig. 1 viewed principally from the front; Fig. 3 is a back view of a shoe including the heel guard; Fig. 4 is a sectional view on the line 4—4 of Fig. 1 and Figs. 5, 6 and 7 are sectional views of forms of the invention adapted for use on heels of different sizes.

Figure 5:
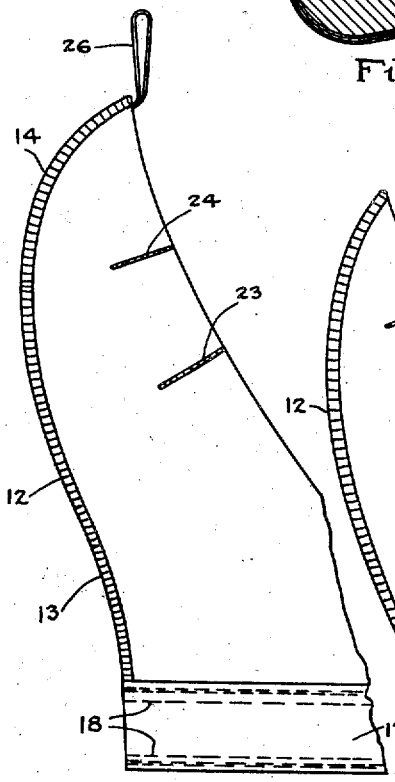
Figure 6:
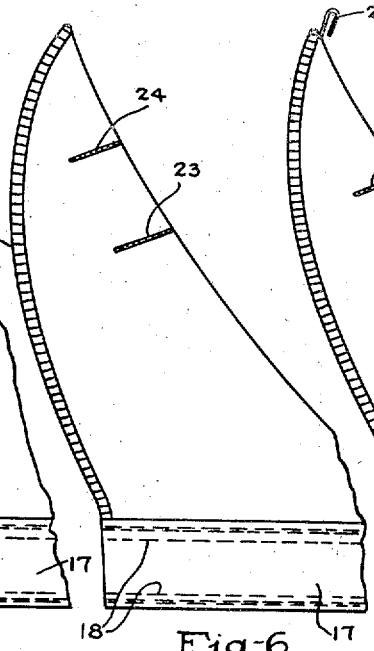

Reference being had to the drawing, it will be understood that my improved device includes a body member or guard proper of fabric or other suitable flexible material shaped to envelope the rear portion of a shoe, particularly the heel and adjacent portions of the quarter at the back and at either side of the shoe forwardly to the shank at the front of the arch. The body member comprises side pieces 10 and 11 shaped as shown in the drawing and united at the back at 12 with a heavy outwardly-turned ribbed seam curved as indicated at 13, 14 to conform with the contour of the heel and quarter at the back of the shoe. The members 10, 11 are extended forwardly as indicated at 15 in Fig. 1, the lower edges of said members being straight, the upper and generally oblique edges thereof being reversely curved. These latter edges curve concavely downward and forward from the back of the guard and convexly upward and rearward from the front thereof so that they will conform closely with the contour of a shoe at the sides of the quarter. At the bottom of the combined members 10, 11 is positioned a U-shaped clip 16 formed from flat spring steel, said clip being secured to the lower margin of the guard by a strip of material 17 sewed to the body members 10, 11 on either side of the U-clip as indicated at 18 in Figs. 5, 6 and 7. The spring clip 16, U-shaped as shown in Fig. 4, has legs 19, 20 extending convergingly from a bight and having outwardly flared end portions 21, 22. As indicated in Figs. 5 and 6, the spring steel member 16 and the parts 10 and 11 united thereto will be formed in different sizes to adapt the device to be applied to heels of different sizes and styles. But one form of device will in practice be applicable to the heels of different sized shoes of the same style and shape.

In shaping the members 10 and 11, I have found it desirable to provide darts 23 and 24 in the inner edges of pieces 10 and 11, and to sew these darts together with an outwardly-extending heavy seam, which causes both a fit of the device to the heel, stiffens the same and produces an attractive appearance.

Figure 7:
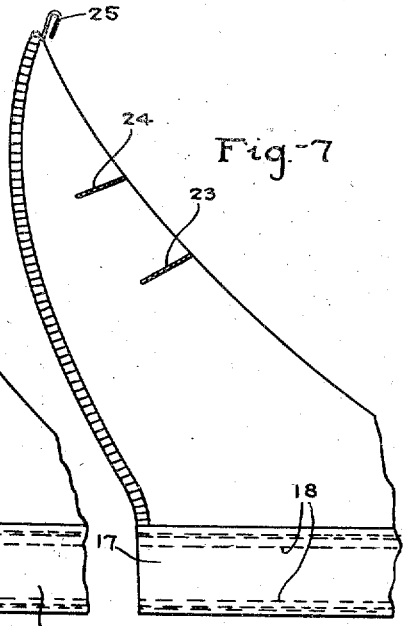

With very wide, low heels, it may be desirable to provide means to secure the device to the upper edge of a shoe. This is accomplished as shown in Fig. 7 by means of a flat hook member 25 which is adapted to slip over the edge of the shoe between it and the stocking and prevent the device from tilting on the foot of the wearer. Only in very broad low heels will such a holding device be desirable, as in all smaller sizes of heels, and, indeed, with the large flat heels, the spring grip of the member 16 over the cloth composing the pieces 10 and 11 will be sufficient in itself to hold the guard device positioned under all conditions of use. In some forms of the device a loop 26 is attached to the upper edge thereof at the end of seam 12 by which the device may be hung or handled in application and withdrawal.

The guard will in practice be used in connection with riding in or driving an automobile, or elsewhere, as at football games and the like, where there is a liability of rubbing and defacing the outer surface of the heel portions of shoes, particularly of women's shoes. In applying the device it is only necessary to present the flared portions 21, 22 of spring member 16 to the back of the heel and push it forward until the device is seated firmly against the heel with the seam 14 extending along the center of the quarter and heel at the back of the shoe. Thus applied to a shoe, the device will remain snugly fitted in place, the bight of the clip 16 embracing and gripping the lower portion of the heel and positioning the legs 19, 20 of the clip underneath the shank of the shoe. The flared extremities 21, 22 of said legs 19, 20 terminate back of and within the lateral limits of the ball of the shoe. In the event that the hook member 25 is used, that may be inserted over the back of the shoe first and then the device pushed into position. In all cases when it is pushed into position the spring member 16 will spread about the heel, contracting beyond its inner limit and, in itself, holding the device smoothly in place wth a firm non-slipping grip.

It will be noted that the reversely curved upper edges of the guard at either side thereof snugly conform with the contour of the shoe and hug the sides of the quarter when the spring member 16 is in place upon the heel and it will be further noted that said spring member, which alone holds the guard in place, is protected against being accidentally scuffed off from the heel by reason of the fact that it lies entirely within the outline of the shoe, the flared portions 21, 22 in such disposition of said member 16 being directly behind the ball of the shoe and thus effectively guarded against being struck by objects such as pedals, levers and the like in a manner which might tend to dislodge the guard.

I claim:

1. A guard for shoe heels comprising two pieces of fabric material secured together along their back meeting edge with an outturned seam, and provided with darts along their inner edges formed with outturned seams, adapted to envelop the heel part of a shoe, and a spring steel U-piece at the bottom of said material and secured thereto and adapted to embrace the bottom of the heel and hold the guard in position.

2. A guard for shoe heels comprising fabric material shaped and secured together to envelope the heel part of a low shoe from the bottom of the heel to the top of the back of the shoe, a spring steel U-piece secured in said fabric at the lower part thereof and adapted to embrace the bottom part of the heel and come beneath the arch of the shoe, said fabric being cut backward so its upper edge fits along and under the narrow part of the shoe above the sole, and darts secured as outturned seams extending from the edge toward the back of said guard as shapers and stiffeners therefor.

3. A guard for shoe heels comprising two pieces of fabric material secured together along their back meeting edges with an outturned seam, and provided with darts along their inner edges formed with outturned seams, adapted to envelope the heel part of a shoe, and a spring steel U-piece secured at the bottom of said material and formed with its ends turned outwardly in the plane of the U-piece and so that the U-piece will closely encircle the bottom part of the heel and its ends come into the space between the heel and below the arch of the shoe.

4. In a protector of the character described, a guard of flexible material shaped smoothly to envelope the heel portion and adjacent instep portions of a shoe, said guard including symmetrical side pieces having reversely curved rear edges joined together and conforming with the center line of the shoe at the back thereof, said pieces having forwardly extending straight lower edges and obliquely extending reversely curved upper edges, each of the latter curving concavely downward and forward from the top of the guard at the back thereof to overreach the bulge at the heel portion of the shoe and convexly upward and rearward from the lower edge of the guard at the front thereof to overreach the concavity along the instep of the shoe, a substantially U-shaped spring clip comprising a bight and leg portions extending therefrom, said clip being attached to the guard along the lower marginal portion thereof and adapted alone to hold said guard snugly fitted to the shoe, the bight of the clip serving yieldingly to embrace the lower portion of the heel and support the leg extensions forwardly thereof beneath the arch of the shoe, said leg extensions acting yieldingly to draw said concave and said convex portions of the said upper edges of said guard snugly against their respective portions of the shoe.

5. In a protector of the character described, a guard of flexible material shaped smoothly to envelope the heel portion and adjacent instep portions of a shoe, said guard having lower edges disposed substantially in the plane of the sole of the shoe and having inclined edges extending upwardly and rearwardly from the lower edges of the guard at the front thereof, a substantially U-shaped spring clip for holding the guard snugly fitted to a shoe, said clip comprising a bight and leg portions extending therefrom, the clip being attached to the guard along its lower edges and being free from said inclined edges, the bight of the clip serving yieldingly to embrace the lower portion of the heel, the leg extensions being supported by the bight forwardly thereof beneath the arch of the shoe and being free from contact with the shoe, said leg extensions tending to spring together and serving to draw forward portions of the guard under the instep of the shoe and tension the inclined edges of said guard along the sides of the shoe.

6. In a protector of the character described, a guard of flexible material shaped smoothly to envelope the heel portion and adjacent instep portions of a shoe, said guard having straight lower edges closely paralleling the plane of the sole of the shoe and having upper edges generally diagonally disposed which extend from the top of the guard at the back thereof to the lower edges of the guard at the front thereof, a substantially U-shaped spring clip for holding the guard snugly fitted to a shoe, said clip comprising a bight and leg portions extending therefrom, the clip being attached to the guard along its lower marginal portion and being free therefrom throughout the remainder thereof, the bight of the clip serving yieldingly to embrace the lower portion of the heel, the leg extensions being supported by the bight forwardly thereof beneath the arch of the shoe and being free from contact with the shoe, said leg extensions tending to spring together and serving to draw portions of the guard together under the instep of the shoe and tension the sides of said guard along the sides of the shoe.

NELL F. WINGET.